United States Patent Office.

FERDINAND CASSEL, OF COLOGNE, PRUSSIA.

Letters Patent No. 106,465, dated August 16, 1870.

IMPROVEMENT IN THE PRESERVATION OF MEAT AND OTHER ARTICLES OF FOOD.

The Schedule referred to in these Letters Patent and making part of the same.

*To all whom it may concern:*

Be it known that I, FERDINAND CASSEL, of Cologne, in the Kingdom of Prussia, a subject of the King of Prussia, have invented or discovered new and useful Improvements in the Preservation of Meat and Other Articles of Food; and I, the said FERDINAND CASSEL, do hereby declare the nature of the said invention, and in what manner the same is to be performed, to be particularly described and ascertained in and by the following statement thereof, that is to say, In order to preserve meat and other articles of food, the meat or other articles are, according to this invention, coated externally with the oil obtained from the corns of grapes.

The oil may, for this purpose, be applied in various ways, and the meat or other articles may be prepared in various ways before the oil is applied to them. For preserving meat it is, however, preferred to proceed as follows:

In the case of animals, they should be killed by bleeding them, that is to say, by letting the blood run away through a cut. To kill the animals by striking them will be less advisable.

The bones should then be cut out, and the flesh divided into small pieces, of about ten to twelve pounds, or smaller, just as is convenient. The fat is also cut away as much as possible, although it is not necessary to entirely get rid of it.

The said pieces are then wrapped separately in linen or pieces of cotton, in which they are allowed to stay for from seven to twelve hours, according to their size, until the flesh is perfectly dry on the outside, and till no more moisture is coming from the surface.

Then the pieces are strung up separately on cords, and are coated everywhere and very carefully with the oil, the thinner the better.

The best way of applying the oil is with a painter's brush, but it may be done also by dipping the pieces into the oil.

In stringing the pieces up on the cord, the needle and the cord ought to be well wetted with the oil, for the purpose of preserving the place where the hole has been made.

After having been coated with the oil, the pieces are hung up in a dry and lofty, airy place, without touching each other, and are allowed to dry for from one to three weeks, according to the climate and temperature.

As soon as the pieces have a hard surface or crust all round them, during which process they generally get a whitish color, and lose from twenty to twenty-five per cent. of their weight, they are ready to be packed into boxes, and to be sent anywhere, and they will keep in any climate for a great length of time.

During the preparation, and the drying of the flesh, all insects and flies, so dangerous to every kind of meat, have to be kept away.

To cook meat preserved in the manner above described, it should first be laid for some time in fresh water, either for one or two days, for the purpose of softening or dissolving the crust, which crust may be eaten just as well as the rest. The longer the meat has been preserved, the longer it should lay in fresh water, and it will be very advisable, also, to put it for some minutes into boiling water before roasting it.

Other articles of food, such as eggs and butter, may be similarly preserved by coating them with the oil obtained from the corns of grapes.

To procure the oil, different modes may be adopted. I will, however, explain two modes by which the oil may be obtained.

The corns of the grapes are first ground to a fine powder. The oil may then be obtained either by extracting it chemically, or merely by expressing it.

For the purpose of expressing the oil, the meal has to be moistened with warm water, and heated for one hour, for the purpose of dissolving the woody parts which surround and contain the oil, after which the meal may be pressed in any well-known manner of oil-pressing.

The oil at first runs off clear and clean, but the last oil contains much slime, which, if allowed to stand, will settle down after a time.

For the purpose of extracting the oil chemically, the best way will be to adopt the well-known apparatus of Mr. Löwenberg, and which is so well known that I do not consider it necessary to give a full description of it. It will be sufficient if I say that the extraction, with this apparatus, is made by means of sulphuric ether ($C_4 H_5 O$) or bisulphide of carbon, ($C S_2$.)

Both of the means above described of procuring the oil have their advantages. By expressing, the oil is obtained directly, and very little colored, but this method does not give much oil, and the last oil expressed contains much slime, which will separate itself only by settling down slowly. By the other mode of extraction, nearly all the oil existing in the corns is obtained, but the oil is very darkly colored; nevertheless it is clear, and free of all slime.

Having thus described the invention, and the manner of carrying it practically into effect, I would have it understood that I claim, under this patent—

The improved method of preserving an article of food by coating it with the oil obtained from the corns of grapes, substantially as before set forth.

FERDINAND CASSEL.

Witnesses:
W. LANGELUDEKE,
KASPAR BÄCKER.